United States Patent [19]

Garvey

[11] 4,351,429
[45] Sep. 28, 1982

[54] CONVEYOR WITH SLIP CLEATS

[75] Inventor: Francis J. Garvey, Newfield, N.J.

[73] Assignee: Garvey Corporation, Blue Anchor, N.J.

[21] Appl. No.: 173,362

[22] Filed: Jul. 29, 1980

Related U.S. Application Data

[63] Continuation of Ser. No. 957,036, Nov. 2, 1978, abandoned.

[51] Int. Cl.³ .................... B65G 15/44; B65G 17/44
[52] U.S. Cl. .................................. 198/688; 198/778; 198/851
[58] Field of Search ............... 198/688, 698, 823–833, 198/822, 840, 699, 607, 719, 697, 778, 724

[56] References Cited

U.S. PATENT DOCUMENTS 1,151,218 8/1915 Schepmann ............... 198/699
3,750,862 8/1973 Knipe ........................ 198/698
3,857,476 12/1974 Heifetz et al. ............. 198/778
4,162,727 7/1979 Summers .................... 198/688

FOREIGN PATENT DOCUMENTS 593979 2/1978 U.S.S.R. .................. 198/698

Primary Examiner—Robert B. Reeves
Assistant Examiner—Douglas D. Watts
Attorney, Agent, or Firm—Anthony A. O'Brien

[57] ABSTRACT

A cleat member for the conveying surface of a conveyor that moves in one or more planes. The conveyor surface may be formed of a plurality of flat, flight attachments and one or more cleat members positioned between spaced flight attachments, all being secured to drive chain. The cleat members include shoulder means permitting the cleat to push as well as to, in certain circumstances, slip under articles such as cartons carried by the conveyor. The shoulder means may also be formed on flat, belt type conveyor surfaces to provide a similar slip cleat in accordance with the invention.

7 Claims, 9 Drawing Figures

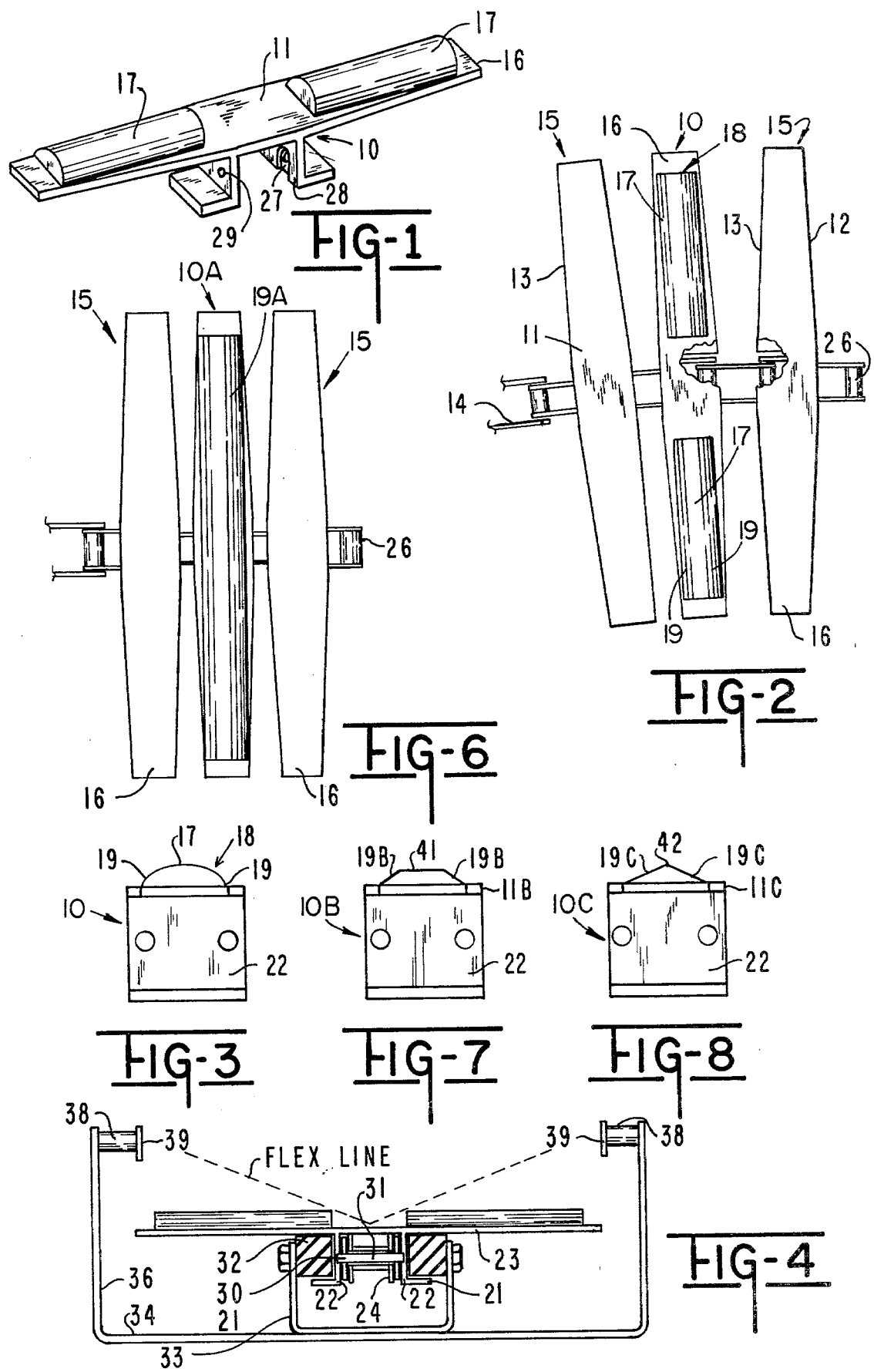

CONVEYOR WITH SLIP CLEATS

CROSS-REFERENCE TO RELATED APPLICATION

This application is a continuation application of my co-pending application Ser. No. 957,036 filed Nov. 2, 1978, now abandoned.

BACKGROUND OF THE INVENTION

1. Field of the Invention

The invention relates to conveyors with cleats for engaging and pushing articles to be conveyed.

2. Description of the Prior Art

Detachable flight attachments secured to the drive chains of both spiral and other chain type conveyors that move in but a single plane are generally known in the prior art. For instance see U.S. Pat. Nos. 3,904,025 (assigned to the same assignee as this patent application) and 2,954,113, the disclosures in both of which are incorporated herein by reference.

As shown in the aforesaid patents, the conveyor surface is formed of a plurality of flat, flight attachments secured in an articulated fashion to either the pin or roller links of a conventional roller type drive chain driven by one or more sprockets as is well known. Thus arranged, the flight attachments form a flat conveyor surface.

As shown in U.S. Pat. Nos. 1,841,339, 3,534,848, 2,591,987 and 2,809,742, it is known to employ upstanding cleats on conveyor belts and drive chains, that are designed to engage and push articles on the respective moving conveyors on which attached usually irrespective of any force opposing continued movement of the articles being conveyed.

Generally, conventional cleats have a leading edge that extends substantially transversely from and considerably above the flat conveyor surface.

Further, conveyor belt cleats configured to turn and rotate cans on a moving conveyor are known (see U.S. Pat. No. 3,085,676) as well as shouldered links adapted for use in a transfer chain (See U.S. Pat. No. 2,366,380).

SUMMARY OF THE INVENTION

The invention is summarized in that a cleat member is provided on the surface of a conveyor that moves in one or more planes and which includes shoulder means permitting the cleat to push as well as slip under, in certain circumstances, articles carried on the moving conveyor surface.

BRIEF DESCRIPTION OF THE DRAWINGS

FIG. 1 is a perspective of a preferred embodiment of a conveyor cleat member in accordance with the principles of the invention;

FIG. 2 is a plan view of a conveyor cleat member in FIG. 1 shown attached to a link of a drive chain in a spiral type roller chain conveyor;

FIG. 3 is an end view of the conveyor cleat member shown in FIG. 2;

FIG. 4 is a cross-sectional view taken along the lines 4—4, in FIG. 2;

FIG. 6 is a plan view similar to FIG. 2 illustrating a modified conveyor cleat member;

FIG. 7 is an end view of another modified conveyor cleat member;

FIG. 8 illustrates an end view of still another modified conveyor cleat member;

DESCRIPTION OF THE PREFERRED EMBODIMENT

Figure 5:
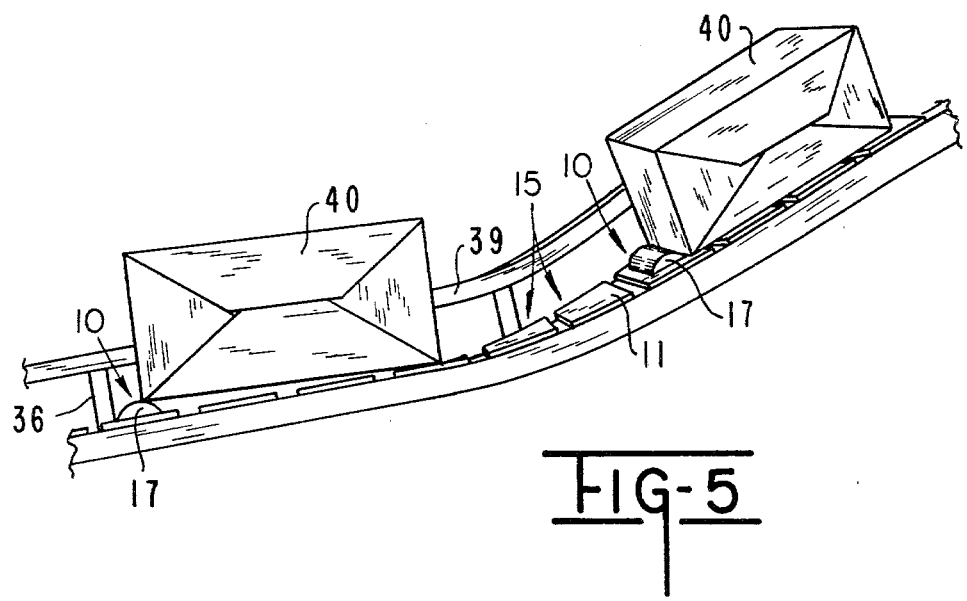
FIG. 5 is a partial, side elevational view illustrating the invention shown in FIGS. 1-4 secured to the drive chain of a spiral type conveyor.

As shown in FIGS. 1-5, a preferred embodiment of a conveyor in accordance with the principles of the invention includes conveyor cleat members indicated generally at 10 and flat members or flight attachments indicated generally at 15 forming a conveyor surface. The members 10 and 15 have an elongated body 11 of molded plastic or the like having a leading edge or face 12 and a trailing edge or face 13 as determined by the direction of movement of a conventional roller type drive chain 14 driven by suitable sprocket means as shown in U.S. Pat. No. 3,904,025.

The body 11, as shown in FIG. 2, is tapered from its mid point to narrowed, opposite ends 16. Each body 11 has a flat upper surface and extends transverse to the chain 14.

This tapered structure permits the cleat members 10 and the flight attachments 15, with cleat members 10 periodically spaced therebetween, to make up a spiral conveyor surface. The cleat members 10 include top surface means indicated generally at 18 comprising a pair of ribs or cleats 17 having gently curved faces or shoulders 19; the ribs 17 are equally spaced from the mid line of the body 11.

The ribs 17 extend toward but stop short of the tapered tips or ends 16. The spaced ribs 17, which may be integrally formed on the body 11 of the cleat member 10 when it is molded or attached as by means of a suitable adhesive, permit the cleat member 10 to be flexed at its mid line. Flexure along the dotted lines, as shown in FIG. 4, spreads the feet 21 attached to spaced legs 22 that depend from the lower surface 23 of body 11. This flexure permits the cleat member 10 to be snapped over the pin link 24 of drive chain 14 which is typically formed of alternate pin and roller links 26.

As shown in FIGS. 1 and 4, spaced ways 27 formed on the inside surfaces 28 of legs 22 lead to holes 29 that receive the heads 30 of the pins 31 when the cleat member 10 is detachably snapped on to the pin link 24. This structure is shown and described in detail in U.S. Pat. No. 2,954,113. Flight attachments 15, identical to cleat members 10 except for the absence of the ribs 17, are attached to the drive chain 14 in the same manner.

The respective flight attachments 15 and cleat members 10 periodically interspersed therebetween are spaced apart at their midlines permitting the respective member to be readily snapped over adjacent or alternate pin links in the drive chain 14. The spacing between cleat members 10 along the conveyor surface is generally determined by the size and number of cartons to be conveyed.

Feet 21 extend horizontally from the legs 22 under spaced, vertically spiraling tracks 32 attached to a U-shaped channel member 33 affixed to a bracket 34 bolted or otherwise secured to one of a plurality of stanchions 36. Tracks 32 support the flight attachments 15 and cleat members 10 forming the conveyor surface.

The bracket 34 also carries spaced, upstanding L-shaped plates 36 that carry hooks 38 which support guide rails 39 to prevent cartons 40 carried on the spiral conveyor from falling off as shown in FIG. 5. The feet 21 serve to keep the flight attachments 17 and cleats properly positioned on the tracks 32. This type of spiral conveyor structure is known as shown in U.S. Pat. No. 3,904,025.

Since the bodies 11 of the cleat members 10 and flight attachments 15 are of the same thickness, the conveyor surface formed thereby is smooth except for the spacing between adjacent tapered flight attachments 15 and similarly tapered cleat members 10 and the ribs 17 extending upward therefrom. Because of the size of the cartons carried, the spacing between the adjacent, articulated conveyor members does not interfere with their movement.

It has been discovered that cleats are needed to engage and push cartons on spiral chain conveyors or other types of conveyors that move in an upward slope when the slope is so steep as to permit slipping of the carton on the conveyor surface. Unlike conventional cleats that extend substantially transversely of the conveyor surface and which as a result tend to engage and crush cartons when a backup occurs and the conveyor continues to move, the gently curved shoulders 19 of this invention permits the cleat 17 to both push cartons along with the conveyor as well as to slip under those that become stationary relative to the moving conveyor.

Thus, the leading faces of curved shoulders 19 engage the trailing edges of cartons 40 and push them along with the drive chain 14 until there should develop a resistance to the cartons continued movement equal or greater than the maximum opposite and opposing force parallel to the conveyor surface exerted by the curved shoulders 19 against the carton 40. This maximum opposing force must be greater than the component of gravitational force of the carton 40 parallel the conveyor surface minus the frictional forces between the carton and conveyor. In conveyors that spiral about a vertical axis, this is determined by the slope of the conveyor surface. In other words, the shoulders 19 are configured so as to stop a carton from slipping on the sloping conveying surface and push it along with the moving drive chain.

Since the ribs 17 are usually formed of the same material as the flight attachments, the maximum opposing force applied by the ribs 17 is generally attributable to the angle of engagement or intersection between the curved leading faces 19 and the conveyor surface. By making this angle small, as in this invention, (substantially less than 90°) the cleat can be designed so the maximum opposing force is but little more than that force required to prevent the force of gravity on the carton 40 causing the carton 40 to slip on the sloping conveyor surface on which the carton is supported.

When an additional force of resistance to the cartons continued movement, other than gravity as mentioned, is added, as when the cartons jam and become or tend to become stationary, the cleat member 10 of this invention, because of the slight angle or slope of the faces 19 relative to the conveyor surface, will slip under such cartons without damage to them. This slipping action not only prevents the moving conveyor from crushing or otherwise damaging the cartons but avoids the necessity of stopping the conveyor to avoid the same.

While a preferred upper surface means 18 has been described as a spaced pair of ribs 17 with curved shoulders 19, the upper surface means may be a single rib 17A with curved shoulders 19A that extends across and on either side of the cleat midline as shown in FIG. 6, the ribs 17A serving as a stiffening member for the cleat member 10A. This structure is used when it isn't necessary to provide a flexible cleat member 10 as previously described.

FIGS. 7 and 8 illustrate still further alternative embodiments of either the flexible or rigid cleat members 10 and 10A. In FIG. 7 the shoulder means takes the form of a rib with gently sloped, leading and trailing beveled faces 19B that rise to a central flat 41. A portion of this flat 41 may be removed at the midline of cleat member 10B to provide spaced ribs, permitting the resulting cleat member 10B to be flexed as cleat member 10.

In FIG. 8 the leading and trailing faces 19C of a rib on a cleat member 10C are gently sloped at a small angle relative to the conveyor surface to a center ridge 42, a portion of which may be removed at the cleat midline to provide a flexible cleat member 10C as cleat members 10 and 10B. Both embodiments of cleat members 10B and 10C may be made rigid by extending the flat 41 or ridge line 42 across the midline of the respective cleats.

While all of the embodiments of the slip cleat members 10, 10A, 10B and 10C in accordance with the principles of the invention have been described as preferably for use on spiral type chain conveyors such as shown in U.S. Pat. No. 3,904,025, the various forms may be used on similar chain drive or flat, continuous belt type conveyors that move in but a single plane while serving the same purposes.

Figure 9:
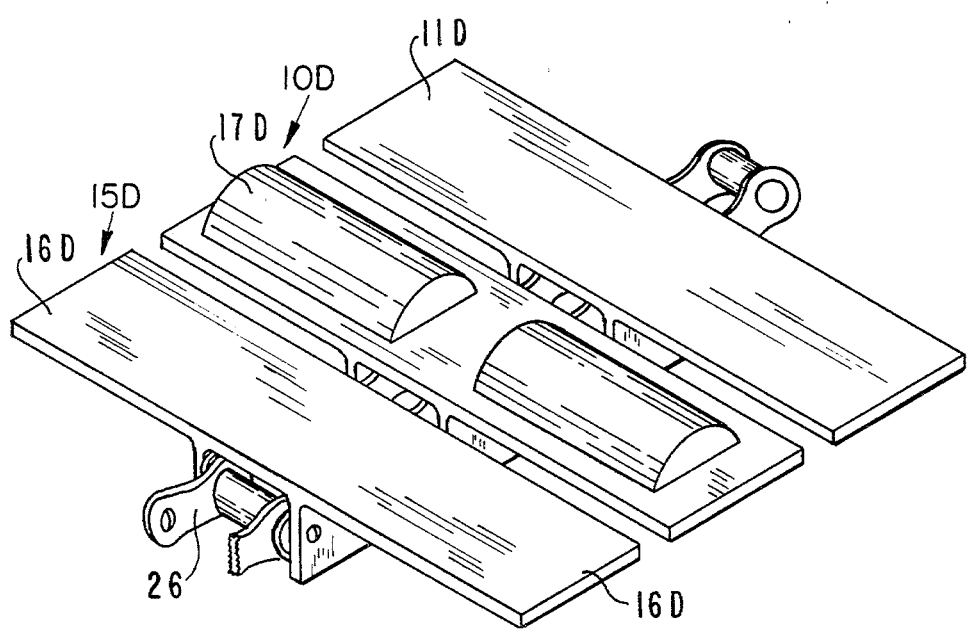
FIG. 9 illustrates yet a further modified conveyor cleat member.

FIG. 9 illustrates the use of the invention in a chain type conveyor that moves in a single plane. In this arrangement the bodies 11D of the respective cleat members indicated generally at 10D and flight attachments indicated generally at 15D are rectangular in shape, there being no need to taper the ends 16D as in the previously described embodiments.

Unlike in and as preferred for spiral conveyors, feet 21 are not required to secure any of the various embodiments of the cleat members on cooperating tracks. Thus, the tracks may be closely spaced or positioned near the opposite ends 16D of the bodies 11D.

While numerous embodiments of slip cleat members in accordance with the principles of the invention have been described in detail, the invention is to be limited only by the scope of the appended claims.

What is claimed is:

1. In a conveyor for upwardly transporting carton-like articles, a structure comprising
   upwardly sloping track means,
   chain means extending along the track means,
   a plurality of flat members attached to the chain means and slidingly supported on the track means,
   a plurality of cleat members periodically positioned between groups of the flat members and spaced apart by at least one dimension of the articles extending between the cleat members,
   said cleat members being attached to the chain means and slidingly supported on the track means,
   said flat members and said cleat members having bodies forming a conveying surface,
   each of said cleat members including rib means extending upwardly therefrom above the conveying surface and having a leading face that extends at a slope substantially less than 90° relative to the conveying surface,
   said leading faces being adapted to exert a maximum force opposing slippage of the articles on the conveying surface, which maximum opposing force is greater than the component of gravitational force of the article parallel to the conveyor surface minus the frictional forces between the articles and conveyor but is less than forces of resistance to movement of the articles which would damage the articles, said chain means including a drive chain formed of chain links joined by pins, said flat members and said cleat members each including a pair of depending legs on opposite sides of a midline thereof for straddling at least one link of the chain links, said depending legs having apertures for receiving the respective pins, and said rib means including a pair of spaced ribs on each cleat member on opposite sides of the midline thereof to permit flexing of each cleat member at the midline to spread the pair of legs.

2. In a conveyor for upwardly transporting carton-like articles, a structure comprising upwardly sloping track means, chain means extending along the track means, a plurality of flat members attached to the chain means and slidingly supported on the track means, a plurality of cleat members periodically positioned between groups of the flat members and spaced apart by at least one dimension of the articles extending between the cleat members, said cleat members being attached to the chain means and slidingly supported on the track means, said flat members and said cleat members having bodies forming a conveying surface, each of said cleat members including rib means extending upwardly therefrom above the conveying surface and having a leading face that extends at a slope substantially less than 90° relative to the conveying surface, said leading faces being adapted to exert a maximum force opposing slippage of the articles on the conveying surface, which maximum opposing force is greater than the component of gravitational force of the article parallel to the conveyor surface minus the frictional forces between the articles and conveyor but is less than forces of resistance to movement of the articles which would damage the articles, said track means being a spiral for directing the flat members and the cleat members in an upward spiral path, said bodies of flat members and the cleat members having tapered ends and being flat with the same thickness, said chain means including a drive chain formed of chain links joined by pins, said flat members and said cleat members each including a pair of depending legs on opposite sides of a midline thereof for straddling at least one link of the chain links, said depending legs having apertures for receiving the respective pins, and said rib means including a pair of spaced ribs on each cleat member on opposite sides of the midline thereof to permit flexing of each cleat member at the midline to spread the pair of legs.

3. The invention as defined in claim 1 or 2 wherein each of said rib means has a rounded profile and each leading face is defined by a portion of the respective rounded porfile.

4. The invention as defined in claim 1 or 2 wherein each rib means has a beveled edge defining the corresponding leading face.

5. The invention as defined in claim 4 wherein each rib means has a top planar surface.

6. The invention as defined in claim 4 wherein each rib means has a top ridge.

7. The invention as defined in claim 1 or 2 wherein flat members and cleat members are made of molded plastic.

* * * * *